(12) United States Patent
Ramalingam et al.

(10) Patent No.: US 10,135,801 B2
(45) Date of Patent: Nov. 20, 2018

(54) ON-LINE ACCOUNT RECOVERY

(71) Applicant: Oath Inc., New York, NY (US)

(72) Inventors: Janarthanam Ramalingam, Bangalore (IN); Atte Lahtiranta, Cupertino, CA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 14/849,320

(22) Filed: Sep. 9, 2015

(65) Prior Publication Data

US 2017/0070510 A1 Mar. 9, 2017

(51) Int. Cl.
*H04L 29/06* (2006.01)
*G06F 21/31* (2013.01)

(52) U.S. Cl.
CPC ......... *H04L 63/08* (2013.01); *G06F 21/316* (2013.01); *H04L 63/0876* (2013.01); *G06F 2221/2131* (2013.01)

(58) Field of Classification Search
CPC .......... G06F 2221/2131; G06F 21/316; H04L 63/0876
See application file for complete search history.

(56) References Cited

U.S. PATENT DOCUMENTS

| | | | |
|---|---|---|---|
| 8,484,730 B1 * | 7/2013 | P. R. | G06F 11/3438 709/225 |
| 8,584,245 B2 * | 11/2013 | Proudler | H04L 63/0853 726/25 |
| 8,621,586 B1 * | 12/2013 | Peer | G06F 21/316 726/2 |
| 8,646,060 B1 * | 2/2014 | Ben Ayed | H04L 63/0853 726/9 |
| 8,655,313 B2 | 2/2014 | Chen | |
| 8,819,803 B1 * | 8/2014 | Richards | H04L 9/3213 380/258 |
| 8,843,997 B1 * | 9/2014 | Hare | H04L 63/0281 709/200 |
| 8,856,923 B1 * | 10/2014 | Kolman | G06Q 20/4016 380/255 |
| 9,084,071 B2 | 7/2015 | Lisboa | |
| 9,231,962 B1 * | 1/2016 | Yen | H04L 63/1408 |
| 9,348,981 B1 * | 5/2016 | Hearn | H04L 9/3271 |

(Continued)

FOREIGN PATENT DOCUMENTS

| | | |
|---|---|---|
| EP | 2466523 | 6/2012 |
| EP | 2 763 435 | 8/2014 |

(Continued)

OTHER PUBLICATIONS

Eckersley, Peter. "How Unique Is Your Web Browser?", Proceedings of the 10th International Conference on Privacy Enhancing Technologies, Springer-Verlag, 2010.

(Continued)

*Primary Examiner* — James R Turchen
(74) *Attorney, Agent, or Firm* — Weaver Austin Villeneuve & Sampson LLP

(57) ABSTRACT

Example methods, apparatuses, and/or articles of manufacture are disclosed that may be implemented, in whole or in part, using one or more computing devices to facilitate and/or support one or more operations and/or techniques for on-line account recovery.

18 Claims, 3 Drawing Sheets

(56) References Cited

U.S. PATENT DOCUMENTS

| | | | |
|---|---|---|---|
| 9,544,771 | B2 | 1/2017 | Schwarzapel et al. |
| 9,633,322 | B1* | 4/2017 | Burger .................. G06Q 10/0635 |
| 9,654,477 | B1* | 5/2017 | Kotamraju ............ H04L 63/102 |
| 9,867,046 | B2 | 1/2018 | Schwarzapel et al. |
| 2003/0018726 | A1 | 1/2003 | Low |
| 2004/0083394 | A1* | 4/2004 | Brebner .................. G06F 21/31 726/19 |
| 2005/0097320 | A1* | 5/2005 | Golan .................... G06F 21/40 713/166 |
| 2005/0278253 | A1* | 12/2005 | Meek ..................... G06F 21/31 705/50 |
| 2006/0143098 | A1 | 6/2006 | Lazaridis |
| 2006/0240824 | A1 | 10/2006 | Henderson |
| 2006/0258341 | A1 | 11/2006 | Miller |
| 2007/0028297 | A1* | 2/2007 | Troyansky .......... H04L 63/1408 726/2 |
| 2007/0294359 | A1 | 12/2007 | Kao |
| 2008/0046435 | A1 | 2/2008 | Watson |
| 2008/0216153 | A1 | 9/2008 | Aaltonen |
| 2009/0187831 | A1 | 7/2009 | Tiwans Shahzad |
| 2010/0250955 | A1* | 9/2010 | Trevithick ............. G06F 21/31 713/185 |
| 2011/0059727 | A1 | 3/2011 | Lisboa |
| 2011/0130126 | A1 | 6/2011 | Friman |
| 2012/0005729 | A1* | 1/2012 | Amitai .................. H04L 63/102 726/4 |
| 2012/0109821 | A1* | 5/2012 | Barbour ................ G06Q 40/02 705/44 |
| 2012/0144464 | A1 | 6/2012 | Fakhrai et al. |
| 2012/0201381 | A1* | 8/2012 | Miller ....................... H04L 9/16 380/255 |
| 2012/0254946 | A1 | 10/2012 | Fleischman et al. |
| 2012/0295601 | A1 | 11/2012 | Lang |
| 2012/0304260 | A1* | 11/2012 | Steeves .................. G06F 21/31 726/5 |
| 2013/0167207 | A1* | 6/2013 | Davis .................... G06F 21/316 726/5 |
| 2013/0198824 | A1* | 8/2013 | Hitchcock ............ G06F 21/00 726/6 |
| 2013/0217361 | A1 | 8/2013 | Mohammed |
| 2014/0052638 | A1 | 2/2014 | Chung et al. |
| 2014/0074941 | A1 | 3/2014 | He |
| 2014/0095638 | A1 | 4/2014 | Chen |
| 2014/0173686 | A1* | 6/2014 | Kgil ..................... H04L 63/205 726/1 |
| 2014/0289820 | A1* | 9/2014 | Lindemann ............ G06Q 20/42 726/5 |
| 2014/0366128 | A1* | 12/2014 | Venkateswaran ....... H04L 63/08 726/19 |
| 2015/0046989 | A1* | 2/2015 | Oberheide ............. G06F 21/44 726/6 |
| 2015/0227724 | A1* | 8/2015 | Grigg .................... H04L 63/083 726/5 |
| 2015/0229623 | A1* | 8/2015 | Grigg .................... H04L 63/08 726/7 |
| 2015/0237049 | A1* | 8/2015 | Grajek ................. H04L 63/0815 726/7 |
| 2015/0242605 | A1* | 8/2015 | Du ......................... G06F 21/32 726/7 |
| 2015/0256973 | A1* | 9/2015 | Raounak ............... H04W 4/029 726/7 |
| 2015/0339664 | A1* | 11/2015 | Wong .................... H04L 9/3234 705/71 |
| 2016/0005044 | A1* | 1/2016 | Moss ................... G06Q 20/4016 705/44 |
| 2016/0019546 | A1* | 1/2016 | Eisen ................... G06Q 20/4016 705/44 |
| 2016/0044509 | A1 | 2/2016 | Schwarzapel et al. |
| 2016/0057619 | A1* | 2/2016 | Lopez ................... H04W 12/04 380/247 |
| 2016/0080379 | A1* | 3/2016 | Saboori ................ H04L 63/0876 726/5 |
| 2016/0087957 | A1* | 3/2016 | Shah ..................... H04L 63/205 726/1 |
| 2016/0110529 | A1* | 4/2016 | Mathew ................ G06F 21/31 726/7 |
| 2016/0134634 | A1* | 5/2016 | Rosendal ............... H04L 63/08 726/4 |
| 2017/0054729 | A1* | 2/2017 | Ford ..................... H04L 63/101 |
| 2017/0063927 | A1* | 3/2017 | Schultz .................. H04L 63/20 |
| 2017/0086071 | A1 | 3/2017 | Schwarzapel et al. |
| 2017/0111340 | A1* | 4/2017 | Gomi ..................... H04L 63/08 |

FOREIGN PATENT DOCUMENTS

| | | |
|---|---|---|
| KR | 10-2012-0107434 | 10/2012 |
| WO | WO 2012/044449 | 4/2012 |
| WO | WO 2016/022857 | 2/2016 |

OTHER PUBLICATIONS

Fisher, R.A. "Statistical Methods for Research Workers", Oliver and Boyd (Edinburgh, 1925), ISBN 0-05-002170-2.
U.S. Appl. No. 14/454,713, filed Aug. 7, 2014, 55 pages.
U.S. Appl. No. 14/454,713: Application Data Sheet filed Aug. 8, 2014, 47 pages.
U.S. Appl. No. 14/454,713: Notice to File Missing Parts, dated Aug. 18, 2014, 2 pages.
U.S. Appl. No. 14/454,713: Filing Receipt, dated Aug. 18, 2014, 3 pages.
U.S. Appl. No. 14/454,713: Applicant Response to Pre-Exam Formalities Notice, dated Oct. 28, 2014, 10 pages.
U.S. Appl. No. 14/454,713: Filing Receipt, dated Oct. 31, 2014, 3 pages.
U.S. Appl. No. 14/454,713: Non-Final Rejection and Examiner search, dated Sep. 22, 2015, 13 pages.
U.S. Appl. No. 14/454,713: Amendment/Req. Reconsideration—After Non-Final Rejection, dated Dec. 31, 2015, 12 pages.
U.S. Appl. No. 14/454,713: Notice of Publication, dated Feb. 11, 2016, 1 page.
U.S. Appl. No. 14/454,713: Final Rejection, dated Apr. 18, 2016, 8 pages.
U.S. Appl. No. 14/454,713: Response After Final Action, dated Jun. 10, 2016, 14 pages.
U.S. Appl. No. 14/454,713: Notice of Allowance and Fees, dated Jun. 29, 2016, 10 pages.
U.S. Appl. No. 14/454,713: RCE, Aug. 23, 2016, 2 pages.
U.S. Appl. No. 14/454,713: Notice of Allowance and Fees, dated Sep. 6, 2016, 8 pages.
U.S. Appl. No. 14/454,713: Issue Fee Payment, dated Dec. 1, 2016, 1 page.
U.S. Appl. No. 14/454,713: Issue Notification, dated Dec. 21, 2016, 1 page.
U.S. Appl. No. 15/366,984: Notice of Publication, dated Mar. 23, 2017, 1 page.
U.S. Appl. No. 15/366,984: Amendment/Req. Reconsideration—after Non-Final Reject, dated May 10, 2017, 36 pages.
U.S. Appl. No. 15/366,984: Final Rejection, dated Jun. 1, 2017, 9 pages.
U.S. Appl. No. 15/366,984: Filing Receipt, dated Dec. 13, 2016, 3 pages.
U.S. Appl. No. 15/366,984: Non-Final Rejection, dated Feb. 9, 2017, 13 pages.
U.S. Notice of Allowance dated Sep. 6, 2017 issued in U.S. Appl. No. 15/366,984.
PCT International Search Report and Written Opinion dated Nov. 18, 2018 issued in PCT/US2015/044099.
PCT International Preliminary Report on Patentability and Written Opinion dated Feb. 7, 2017 issued in PCT/US2015/044099.
European Extended Search Report dated Feb. 13, 2018 issued in Application No. EP 15 82 9751.

* cited by examiner

ON-LINE ACCOUNT RECOVERY

BACKGROUND

1. Field

The present disclosure relates generally to on-line account management systems.

2. Information

For on-line account recovery, such as to regain access to a registered Internet-type account if a password is misplaced or forgotten, for example, existing on-line account management systems typically employ messaging services, such as a Short Message Service (SMS), e-mail, or the like to send a code or like verification key to an alternate e-mail address, cell phone, etc. for a user to enter to authenticate or verify that user's identity. At times, however, this or like verification process or procedure may be possible to circumvent or bypass, such as, for example, if a cell phone has been lost or stolen, an alternate account has been hacked or compromised, etc. Greater flexibility and/or variety of other potential verification approaches, such as without imposing a significant burden on a valid on-line account holder, for example, while maintaining account security may therefore be desirable.

BRIEF DESCRIPTION OF THE DRAWINGS

Claimed subject matter is particularly pointed and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
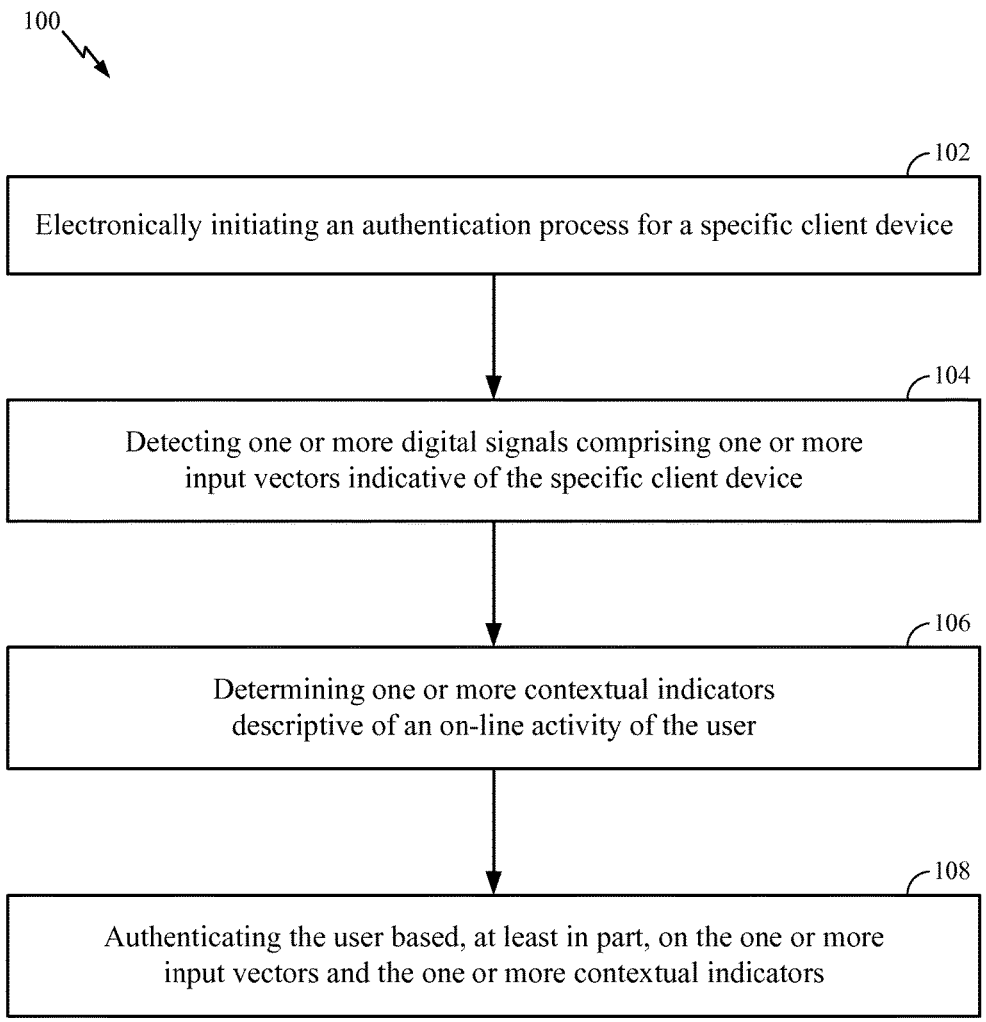
FIG. 1 is a flow diagram illustrating an implementation of a process for on-line account recovery.

Reference is made in the following detailed description of the accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

With advances in technology, it has become more typical to employ distributed computing approaches in which a computational problem may be divided among computing devices, including one or more clients and one or more servers, via a computing and/or communications network. A network may comprise two or more network devices and/or may couple network devices so that signal communications, such as in the form of signal packets, for example, may be exchanged, such as between a server and a client device and/or other types of devices, including between wireless devices coupled via a wireless network, for example. A network may be very large, such as comprising thousands of nodes, millions of nodes, billions of nodes, or more, as examples.

In this context, the term network device refers to any device capable of communicating via and/or as part of a network and may comprise a computing device. While network devices may be capable of sending and/or receiving signals (e.g., signal packets), such as via a wired or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof. Signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as computing and/or communication protocols (e.g., network protocols), may interoperate within a larger network. In this context, the term sub-network refers to a portion or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link or connection between otherwise separate and/or independent LANs.

In this context, a private network refers to a particular, limited set of network devices able to communicate with other network devices in the particular, limited set, such as via signal packet transmissions, for example, without a need for re-routing and/or redirecting such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known or later developed. The Internet includes local area networks (LANs), wide area networks (WANs), wireless networks, and/or long haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address. Although the Internet comprises a network of interoperable networks, not all of those interoperable networks are necessarily available or accessible to the public.

Although physically connecting a network via a hardware bridge is done, a hardware bridge may not typically include a capability of interoperability via higher levels of a network protocol. A network protocol refers to a set of signaling conventions for computing and/or communications between or among devices in a network, typically network devices; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol has several layers. These layers may be referred to here as a network stack. Various types of network transmissions may occur across various layers. For example, as one moves higher in a network stack, additional operations may be available by initiating network transmissions that are compatible and/or compliant with a particular network protocol at these higher layers. Therefore, for example, a hardware bridge may be unable to forward signal packets since it may operate at a layer of a network stack that does not provide that capability. Although higher layers of a network protocol may, for example, affect device permissions, user permissions, etc., a hardware bridge, for example, may typically provide little user control, such as for higher layer operations.

A VPN, such as previously described, may enable a remote device to communicate via a local network, but may also have drawbacks. A router may allow network communications in the form of network transmissions (e.g., signal packets), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations.

Some example methods, apparatuses, and/or articles of manufacture are disclosed herein that may be used, in whole or in part, to facilitate and/or support one or more operations and/or techniques for on-line account recovery, such as implemented in connection with one or more computing and/or communication networks and/or protocols (e.g., network protocols) discussed above, for example. As was indicated, at times, on-line account recovery may, for example, be employed, at least in part, to allow an on-line user, such as an Internet user associated with a registered account of a provider of goods and/or services to regain access to such an account. As used herein, "on-line" refers to a type of access that may be implemented via one or more computing and/or communications networks, such as, for example, the Internet, an intranet, a device network, a network for peripherals, a computer network, or the like. In this context, "account," "on-line account," "registered account," "established account," or similar terms may be used interchangeably and refer to an on-line-type service, resource, and/or content provided, assigned to, and/or owned by a particular on-line user, such as under terms of a service or like agreement, for example. To illustrate, an on-line account may comprise, for example, an e-mail account, social media account, banking account, merchant account, educational account, or the like. On-line accounts are generally known and need not be described here in greater detail.

As used herein, "content" should be interpreted broadly and refers to signals, such signal packets, for example, and/or states, such as physical states on a memory device, for example, but otherwise is employed in a manner irrespective of format, such as any expression, realization, and/or communication, for example. Likewise, content may comprise any information, knowledge, and/or experience, for example, such as in the form of signals and/or states, physical or otherwise. In this context, "electronic" or "on-line" content refers to content in a form that although not necessarily capable of being perceived by a human, (e.g., via human senses) may nonetheless be transformed into a form capable of being so perceived, such as visually and/or audibly, for example. Examples may include text, audio, images, video, combinations, etc. Thus, content may be stored and/or transmitted electronically, such as before or after being perceived by human senses. In general, it may be understood that electronic and/or on-line content may be intended to be referenced in a particular discussion, although in the particular context the term "content" may be employed for ease of discussion. Particular examples of content may include an e-mail message, text message, audio file, video file, web page, or the like. Claimed subject matter is not intended to be limited to these examples, of course.

As alluded to previously, after registering an on-line account, to access and/or use an associated service, a user may be asked to log into the account, such as by inputting one or more appropriate authenticators, such as via an appropriate log-in page, for example. In this context, "authenticator" refers to content or a piece of content used, at least in part, to verify an identity and/or credentials of an on-line user. For example, an authenticator may comprise a username, password, user ID, or the like. In some instances, however, such as to regain access to a registered account if one or more authenticators are lost or forgotten, for example, an on-line account management or like system may implement an authentication process, such as to verify a user's identity. For example, an on-line account management or like system may electronically send a verification code or like key to an alternate e-mail address, cell phone, etc. for a user to enter. A user may, for example, enter a communicated code or key via a suitable log-in and/or account recovery page, such as via clicking on an appropriate hyperlink provided by an account recovery or like system. At times, however, this or like authentication process may be possible to circumvent or bypass, as was indicated, such as if a cell phone has been lost or stolen, for example, an alternate e-mail account has been hacked or compromised, or the like.

In addition, at times, an authentication process may be relatively burdensome and/or intrusive, such as, for example, if a legitimate account holder is asked to verify his or her identity by navigating through a series of menu options, answering a host of personal and/or tedious questions, or the like. The terms "account user" and "account holder" may be used interchangeably herein. In some instances, going through a burdensome and/or intrusive authentication process may adversely affect overall user on-line experience, usability of an on-line account, increase account sign-in and/or sign-up costs, or the like. Accordingly, it may be desirable to develop one or more methods, systems, and/or apparatuses that may facilitate and/or support more effective and/or more efficient on-line account recovery, such as without imposing a significant burden on a legitimate on-line account holder, for example, while maintaining account security.

Thus, as will be described in greater detail below, in an implementation, an authentication process, such as to verify an identity of an an-line user, such as an Internet user associated with a registered account of a provider of goods and/or services may, for example, be electronically initiated, such as via a suitable server, client device, or any combination thereof. Here, one or more digital signals may, for example, be sampled and used, at least in part, as input to compute one or more probabilities, such as, for example, a probability of a client device being a trusted device and/or a probability of user being a valid account holder. Based, at least in part, on one or more computed probabilities, an on-line account user may, for example, be authenticated, and/or an account recovery process may implemented, if warranted. For example, in some instances, such as if one or more computed probabilities meet a certain threshold value, a user may be granted access to a registered on-line account, such as without further identity verification, just to illustrate one possible implementation. At times, however, such as if one or more computed probabilities do not meet a certain threshold value, for example, an appropriate challenge and/or a set of challenges may be generated and/or presented to an on-line user, as will also be seen.

FIG. 1 is a flow diagram illustrating an implementation of an example process 100 that may be performed, in whole or in part, to facilitate and/or support one or more operations and/or techniques for on-line account recovery. As was indicated, at times, on-line account recovery may be implemented, at least in part, to electronically authenticate an on-line user, such as an Internet user associated with a registered account of a provider of goods and/or services, for example. It should be noted that content acquired and/or produced, such as, for example, input signals, output signals, operations, results, etc. associated with example process 100 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example authentication process 100 may, for example, begin at operation 102 with electronically initiating an authentication process for a specific client device. In this context, "client device" refers to any kind of special purpose computing device and/or apparatus that may be capable of communicating with other computing apparatuses and/or devices through wired and/or wireless transmission and/or receipt of signals or like content over suitable computing and/or communications networks according to one or more protocols. Depending, at least in part, on an implementation, a client device may comprise, for example, a mobile device, a stationary device, or any combination thereof. A mobile device may comprise, for example, a client device that may from time to time have a position and/or location that changes. A stationary device may comprise, for example, a client device that may have a position and/or location that typically, although not necessarily, does not change. As a way of illustration, client devices, may include, for example, cellular telephones, satellite telephones, smart telephones, voice over internet protocol (VoIP) or IP telephones, desktop computers, personal digital assistants (PDAs), laptop computers, personal entertainment systems, tablet personal computers (PC), personal audio or video devices, personal navigation devices, e-book readers, or the like. Claimed subject matter is not so limited, of course.

Further, as used herein, a "specific client device" refers to a client device capable of being at least partially identified via one or more digital signals (e.g., signal samples, etc.) originating from and/or attributable to such a client device. For example, as discussed below, in some instances, a client device may be identified, at least in part, via one or more features associated with sampled signals, such as a browser fingerprint, browser cookie, Internet protocol (IP) address (and/or associated geographic location, etc.), etc., or any combination thereof. It should also be noted that a specific client device may be intended to be referenced in a particular discussion, although in the particular context the term "client device" may be employed for ease of discussion.

In at least one implementation, an electronic authentication process may, for example, be initiated via a client device, as was indicated. In this context, "electronic authentication process" refers to a process implemented via a computing device to verify an identity of an on-line user, such as an Internet user associated with a registered account of a provider of goods and/or services. For example, an account holder may use an interface on a client device to access an appropriate web page (e.g., a Yahoo!® Mail log-in page, etc.), click on an appropriate hyperlink (e.g., "Forgot password?", "I can't access my account", etc.) that may be embedded within an applicable log-in page, etc., just to illustrate a few possible implementations. Here, accessing a web page, clicking on a hyperlink, etc. may, for example, initiate an authentication process, such as via generating and/or originating a web or like request for applicable content (e.g., an account recovery page, etc.), for example, which may bring up such content on a screen or display of a client device, such as via one or more applicable client-server communications. For example, a client device may include a network browser or like application that may enable a client device to access and/or display electronic content located on one or more servers associated with a network and/or system (e.g., an account recovery system, etc.), such as, for example, a local area network (LAN), a wide area network (WAN), the World Wide Web, the Internet, or the like. As such, in some instances, in response to an appropriate web or like request (e.g., accessing a web page, clicking on a hyperlink, etc.), a host browser may receive one or more digital signals comprising applicable content from a network server, such as for rendering of such content on a screen or display of a client device in connection with on-line user's identity verification, for example, as discussed below. Client-server communications and/or network browsers are generally known and need not be described here in greater detail.

In at least one implementation, an authentication process may, for example, be initiated via a suitable server, as was also indicated. For example, at times, a server may initiate an authentication process upon detecting a user's failed attempt to sign-in to a registered account, user's accessing an account recovery page (e.g., without a specific authentication request from a client device, etc.), or the like. Similarly, here, a failed sign-in attempt, user's accessing an account recovery page, etc. may, for example, be detected, such as by a server, via one or more digital signals sampled and/or obtained in connection with one or more appropriate client-server communications. Of course, these are merely examples relating to initiating an authentication process, and claimed subject matter is not intended to be limited in this regard. For example, in some instances, an authentication process may be initiated according to some pre-defined schedule, on a periodic basis, or the like.

Continuing with the above discussion, at operation 104, one or more digital signals comprising one or more input vectors indicative of a specific client device may, for example, be detected. In this context, "input vector" refers to input signals and/or signal samples represented via a vector. Depending, at least in part, on an implementation, one or more input vectors may be detected, for example, via a server or any other suitable device, such as a network device discussed above. Here, any suitable signal processing and/or detection techniques, such as modulation, demodulation, channel output detection, vector space interpretation, etc. may be used, in whole or in part. For example, in some instances, one or more sampled digital signals, such as represented via any suitable waveform, modulated or otherwise, may comprise and/or be interpreted as one or more sets of input vectors or like components (e.g., vector signal constellations, etc.), discrete or otherwise, within an associated vector space (e.g., infinite dimensional vector space, etc.). Thus, at times, these one or more signals may, for example, be decoded and/or demodulated, such as using one or more appropriate processing techniques, for example, to allow for detection of the presence of one or more input vectors. These or like signal processing and/or detection techniques as well as various vector-type signal processing including in connection with vectors comprising signals and/or signal samples are generally known and need not be described here in greater detail.

In some instances, one or more detected input vectors may, for example, be indicative of a specific client device, as was indicated. For example, in at least one implementation, one or more detected input vectors may be used, at least in part, to at least partially identify a participating client device, such as a client device of a user to be authenticated. For purposes of explanation, conceptually, one or more input vectors may, for example, be thought of as helping to answer a question whether a particular client device is a trusted device and/or to what extend (e.g., a degree of trustworthiness, etc.). As such, even though references to a vector-type signals and/or signal samples are made throughout the present specification, such as for ease of discussion, any suitable signals and/or signal samples and/or processing approaches, such as helping to answer these or like questions, for example, may be employed herein, in whole or in part.

More specifically, in certain simulations or experiments, it has been observed that one or more digital signals comprising one or more detected input vectors may include, for example, one or more features that may be attributed to a particular client device, such as with a statistically significant and/or sufficient degree of certainty. For example, as was indicated, a client device may comprise a web browser or like application that may generate, transmit, or otherwise make available (e.g., in connection with applicable client-server communication(s), etc.) one or more digital signals comprising, for example, an authentication or like request (e.g., an HTTP request, etc.), failed attempt to log-in, or the like, as was indicated. These one or more digital signals may be sampled via any one of a host of mechanisms, such as via a server or like network device in connection with an appropriate vector-space interpretation discussed above, for example, and one or more features of a browser hosted on a participating client device may be identified and/or collected. In some instances, one or more identified and/or collected features may, for example, be sufficiently distinguishable and/or unique so as to create a relatively distinctive browser fingerprint capable of identifying an associated client device with a statistically significant and/or sufficient degree of certainty. See, as an example, Eckersley, Peter. "How unique is your web browser?" *Proceedings of the 10th international conference on Privacy enhancing technologies*. Springer-Verlag, 2010. Of course, claimed subject matter is not intended to be limited to one particular browser fingerprinting approach, technique, and/or feature. For example, in some instances, to at least partially identify a participating client device, a browser cookie, browser plug-in, Internet protocol (IP) address, or like features may be used, at least in part, such as in a like fashion without deviating from the scope and/or spirit of claimed subject matter.

With regard to operation 106, one or more contextual indicators descriptive of an on-line activity of a user may, for example, be determined. Likewise, here, one or more contextual indicators may, for example, be determined via a server or like network device, such as in connection with one or more applicable client-server communications. As used herein, a "contextual indicator" refers to one or more signals and/or signal samples capable of providing context of an on-line user's account-related activity. For example, conceptually, one or more contextual indicators may be thought of as helping to answer a question whether a particular user is a trusted user and/or to what extend (e.g., a degree of trustworthiness of a user, etc.). Thus, similarly, even though particular examples of contextual indicators are discussed herein, any other suitable indicators capable of answering these or like questions, for example, may be employed herein, in whole or in part.

Thus, depending, at least in part, on an implementation, one or more contextual indicators may comprise, for example, a history of password changes by a user, a history of failed sign-in attempts by a user, a history of successful sign-in attempts by a user, a history of authentication attempts by a user, or any combination thereof. For example, these or like contextual indicators may be collected via any one of a host of mechanisms, such as while an on-line account is in use, during applicable client-server communications, etc., and may be stored as one or more digital signals with reference to a user ID, user profile, or like identifiers in a suitable database or like repository. In some instances, such as while authenticating an on-line user, such as an Internet user associated with a registered account of a provider of goods and/or services, such a database may, for example, be accessed, such as via a suitable server, as one possible example, and one or more contextual indicators applicable to a particular account user may be determined. For example, for a particular account user, it may be determined whether there has been a recent password change, whether account recovery has been requested after some period of account inactivity, how many times a password change has been requested and/or geo-location(s) of such request(s), a number of previous account recovery attempts, or the like. Claimed subject matter is not intended to be limited to these particular determinations, of course.

At operation 108, a user may, for example, be authenticated based, at least in part, on one or more input vectors and one or more contextual indicators. For example, at times, one or more input vectors of interest, such as detected at operation 104, for example, may be assigned a value reflective of a degree of trustworthiness of a specific client device. At times, an assigned value may comprise, for example, a vector score, such as, for example, providing a measurement (e.g., "best guess") of a likelihood of a specific client device being a trusted device, just to illustrate one possible implementation. A vector score may be determined, at least in part, experimentally and may be pre-set, for example, or otherwise dynamically determined depending, at least in part, on a client device, provider of goods and/or services, application, or the like.

By way of example but not limitation, in one particular simulation or experiment in which multiple input vectors were detected, vector scores of 0.2, 0.1, and 0.1 for input vectors of a likelihood of a specific client device being a trusted device via a browser fingerprint, a browser cookie, and an IP address, respectively, were assigned and/or used. Based, at least in part, on detected input vectors, an input vector probability score may, for example, be computed, such as via a summation of applicable vector scores for respectively detected input vectors, just to illustrate one possible implementation. Thus, consider, as an example:

Input Vector Probability Score=0.2+0.1+0.1=0.4

It should be noted that claimed subject matter is not so limited, of course. For example, not all detected input vectors are necessarily intended to be used to compute an input vector probability score. To illustrate, at times, two out of three detected input vectors may, for example, be used. Also, instead of or in addition to a summation operation, a median, a mean, a mode, a percentile of mean, a number of instances, a ratio, a rate, a frequency, an entropy, mutual information, probability, etc., or any combination thereof may be used herein, at least in part.

Further, in a like fashion, one or more contextual indicators of interest, such as determined at operation 106, for example, may be assigned a value reflective of a degree of trustworthiness of a user to be authenticated. At times, an assigned value may comprise, for example, a contextual indicator score, such as, for example, providing a measurement (e.g., "best guess") of a likelihood of a user of interest being a valid account holder, just to illustrate one possible implementation. Likewise, a contextual indicator score may be determined, at least in part, experimentally and may be pre-set, for example, or otherwise dynamically determined depending, at least in part, on a user, provider of goods and/or services, application, or the like.

Similarly, in at least one implementation, a probability score for one or more contextual indicators may, for example, be computed, such via a summation of separate contextual indicator scores, if any, for respectively determined or suitable contextual indictors. By way of example but not limitation, in one particular simulation or experiment in which multiple contextual indicators were determined, contextual indicator scores of 0.1, 0.1, 0.1, and 0.2 for contextual indictors indicative of a history of password changes, history of failed sign-in attempts, history of successful sign-in attempts, and history of authentication attempts, respectively, were assigned and/or used. Likewise, based, at least in part, on one or more detected contextual indictors, a probability score for the indictors may, for example, be computed, such as via a summation of separate contextual indicator scores. Thus, consider, as an example:

$$\text{Contextual Indictor Probability Score} = 0.1 + 0.1 + 0.1 + 0.2 = 0.5$$

Again, it should be noted that a summation is just one possible example operation that may be used, at least in part, for computing a probability score with respect to one or more contextual indicators, and that claimed subject matter is not intended to be limited in this regard. For example, at times, a median, a mean, a mode, a percentile of mean, a number of instances, a ratio, a rate, a frequency, an entropy, mutual information, probability, etc., or any combination thereof may be used, at least in part, such as instead of or in addition to a summation operation. Likewise, here, any suitable number of contextual indicators of interest determined with respect to a particular user, such as, for example, three out of four, two out of three, etc. indicators, etc. may be employed, in whole or in part.

Continuing with the above discussion, based, at least in part, on one or more probability score computed for one or more input vectors and one or more contextual indicators, a particular on-line user, such as an Internet user associated (e.g., via ownership, assignment, etc.) with a registered account of a provider of goods and/or services, for example, may be authenticated. For example, here, based, at least in part, on one or more input vector and/or contextual indicator probability scores, a confidence score may be computed and used, at least in part, to authenticate an on-line account user. At times, a confidence score may, for example, be computed via a summation of computed probability scores for one or more input vectors and one or more contextual indictors. Thus, using the above example, consider, as a way of illustration:

$$\text{Confidence Score} = 0.4 + 0.5 = 0.9$$

Again, it should be noted that a summation is just one possible example of computing a confidence score to which claimed subject matter is not limited. For example, here, a median, a mean, a mode, a percentile of mean, a number of instances, a ratio, a rate, a frequency, an entropy, mutual information, probability, etc., or any combination thereof may, for example, be used, at least in part. In some instances, to compute a confidence score, the Fisher's method may, for example, be employed, at least in part. For purposes of explanation, the Fisher's method may utilize a combined probability approach using results from a number of statistically independent probability estimations and/or processes, such as, in this context, a probability of a specific client device being a trusted device and/or a probability of a user being a valid account holder, for example. See, e.g., Fisher, R. A. *Statistical Methods for Research Workers*. Oliver and Boyd (Edinburgh, 1925). ISBN 0-05-002170-2. Of course, claimed subject matter is not intended to be limited to particular scores and/or computing approaches.

As was indicated, at times, based, at least in part, on a computed confidence score, an on-line user may, for example, be authenticated. For example, here, a computed confidence score may be compared against some threshold value, such as a confidence threshold value, just to illustrate one possible implementation. In some instances, such as if a computed confidence score meets a confidence threshold value, for example, a user may be granted access to a registered on-line account without further identity verification, such as without entering additional details, answering personal or like questions, or the like, as will be seen. A confidence threshold value may, for example, be established and/or pre-set, such as experimentally, dynamically, etc., which may depend, at least in part, on a client device, user, provider of goods and/or services, application, or the like. For example, at times, a confidence threshold value may be established based, at least in part, on a computed confidence score, such as represented via a certain percentage, fraction, factor, of the score (e.g., a confidence threshold value is 0.8 confidence score, probability score, etc.). By way of example but not limitation, in one particular simulation or experiment, a confidence threshold value of about 0.9 may be considered beneficial for authenticating a user based, at least in part, on one or more detected input vectors and one or more determined contextual indicators. Of course, a confidence threshold value is provided herein merely as an example to which claimed subject matter is not intended to be limited.

Thus, as a way of illustration, using the above example, a confidence score of 0.9 may, for example, be sufficient to authenticate an on-line account user, since the score meets an example confidence threshold value of 0.9 in this particular example. Accordingly, in some instances, an account user who forgot or misplaced a password or like authenticator may, for example, be granted access to a registered account, such as without entering additional details, answering personal or like questions, or the like. For example, here, an on-line account user may be granted access to his or her registered account by simply accessing an account recovery page (e.g., from a client device determined to be a trusted device, as a trusted or valid account holder, etc.), by clicking on an appropriate hyperlink (e.g., "Unable to sign in?", etc.), or the like, just to illustrate a few possible implementations. As was indicated, this or like authenticating approach may be less burdensome and/or intrusive and, as such, may improve overall user experience, increase usability of an on-line account, decrease sign-in and/or sign-up costs, or the like.

In some instances, however, such as if a confidence score falls below or does not meet a confidence threshold value, for example, access to a registered account may be denied, and an appropriate challenge may be generated, such as determined and/or presented to an on-line account user. For example, an appropriate challenge may be generated based, at least in part, on a remainder confidence score computed based, at least in part, on a previously computed confidence score and confidence threshold value. As a way of illustration, in at least one implementation, a remainder confidence may comprise, for example, a score that remains or is "left over" after comparing (e.g., subtracting, etc.) a confidence score with/from a confidence threshold value. Again, using the above examples, but without any limitation, thus, for a confidence score of 0.4 and confidence threshold value of 0.9, a remainder confidence score may comprise, for example:

$$\text{Remainder Confidence Score} = 0.9 - 0.4 = 0.5$$

Again, it should be noted that claimed subject matter is not intended to be limited to a particular score and/or approach, of course. For example, instead of or in addition to a subtraction operation, a median, a mean, a mode, a percentile of mean, a number of instances, a ratio, a rate, a frequency, an entropy, mutual information, probability, etc., or any combination thereof may be used herein, at least in part.

According to an implementation, based, at least in part, on a computed remainder confidence score, one or more challenges may, for example, be generated, such as determined and/or presented to a user. For example, a level of difficulty of a challenge may correspond to or correlate with a remainder confidence score. As a way of illustration, as one approach, a level of difficulty of a challenge may, for example, correlate directly with a remainder confidence score (e.g., the higher the score, the more difficult the challenge, etc.). In some instances, a level of difficulty of a challenge may, for example, correlate inversely with a remainder confidence score (e.g., the higher the score, the less difficult the challenge, etc.). Also, instead of a particular challenge (e.g., one difficult challenge, etc.), a number of challenges (e.g., two challenges of a lesser difficulty, etc.) may, for example, be presented, such as in a progressive, consecutive, simultaneous, etc. manner, just to illustrate another possible implementation. Thus, any suitable challenge and/or combination of challenges may be utilized herein, in whole or in part.

By way of example but not limitation, a challenge may include one or more listed below. Claimed subject matter is not intended to be limited to these examples, of course. Again, it should be noted that a challenge may, for example, be presented to a user separately or as a set, such as according to some sequence, combination, or the like.

Asking a user to enter a verification code or like key (e.g., via a log-in page, account recovery page, etc.) communicated to a client device via one or more appropriate techniques, such as via an SMS, text message, or the like.

Asking a user to verify a client device via entering a particular text message, making a voice call, or the like.

Verifying a client device via a push notification and/or applicable user input (e.g., clicking on an embedded link, "Verify" button, etc.).

Asking a user to verify an alternate e-mail address.

Asking a user to log in using one or more particular authenticators, such as a two-factor YubiKey authenticator (see, e.g., www.yubico.com/why-yubico/for-individuals), a keyed-hash message authentication code (HMAC)-based one-time password (OTP) algorithm or OTP-HOTP (e.g., see, www.wikipedia.org/wiki/HMAC-based_One-time_Password_Algorithm), a two-factor FIDO authenticator (see, e.g., www.fidoalliance.org/specifications/overview), Time-based One-time Password Algorithm (TOTP) (see, e.g., www.wikipedia.org/wiki/Time-based_One-time_Password_Algorithm), or the like.

Likewise, here, if a challenge score assigned to a particular challenge (or a sum of scores if a set of challenges is used, etc.) meets a challenge threshold value, such as if a user verifies an alternate e-mail address, inputs a correct code or key, provides appropriate verification details via a text message, voice call, etc., a user may be authenticated, such as granted access to a registered account, for example. If a challenge score falls below a challenge threshold value, however, access to a registered account may, for example, be denied, and another challenge or a set of challenges may be generated, such as in a similar fashion. Likewise, here, a resulting challenge score may yet again be compared against a challenge threshold value, for example, such as for authenticating a user, as discussed above. In some instances, such as if a number of attempted challenges exceeds some lockout threshold value, which may be set according to a user account lockout policy, for example, an authentication process may be terminated, and a registered on-line account may be locked. In such a case, an on-line account may remain locked until it is reset by an administrator, for example, until a lockout duration policy setting expires (e.g., a certain number of minutes, days, etc.), or the like. A lockout threshold value may be determined, at least in part, experimentally and may be pre-set, for example, or otherwise dynamically determined depending, at least in part, on an on-line account, client device, provider of goods and/or services, application, or the like.

Thus, utilizing a functional representation of or symbolizing the above-referenced approach, consider, for example, the following relation:

$$\sum_i I_i + \sum_i X_i = S \quad (1)$$

where $I_i$ denotes a set of input signals (e.g., signal samples, etc.), $X_i$ denotes a challenge, and S denotes a challenge score (to be compared with a challenge threshold value for a successful log-in). Again, even though a summation operation is used herein to compute a challenge score, any other suitable approaches, such as discussed above, for example, may be used, in whole or in part.

Further, to generate an appropriate challenge, such as using the above-referenced approach, for example, the following relation may be employed:

$$\sum_i X_i = S - \sum_i I_i \quad (2)$$

Again, other suitable operations or approaches (e.g., a division, etc.), such as discussed above, for example, may be employed, such as according to an implementation. It should be noted that, in some instances, any additional or subsequently generated challenge (or a set of challenges), if applicable, may have a higher level of difficulty, for example, since a probability of a user being a valid account holder may typically diminish as failed responses and/or authentications proceed (e.g., a challenge score not meeting a challenge threshold value, etc.). For example, a first challenge may be asking a user to verify his or her e-mail address, and a subsequent challenge may be verifying a user's identity via a YubiKey. Claimed subject matter is not so limited, of course.

Figure 2:
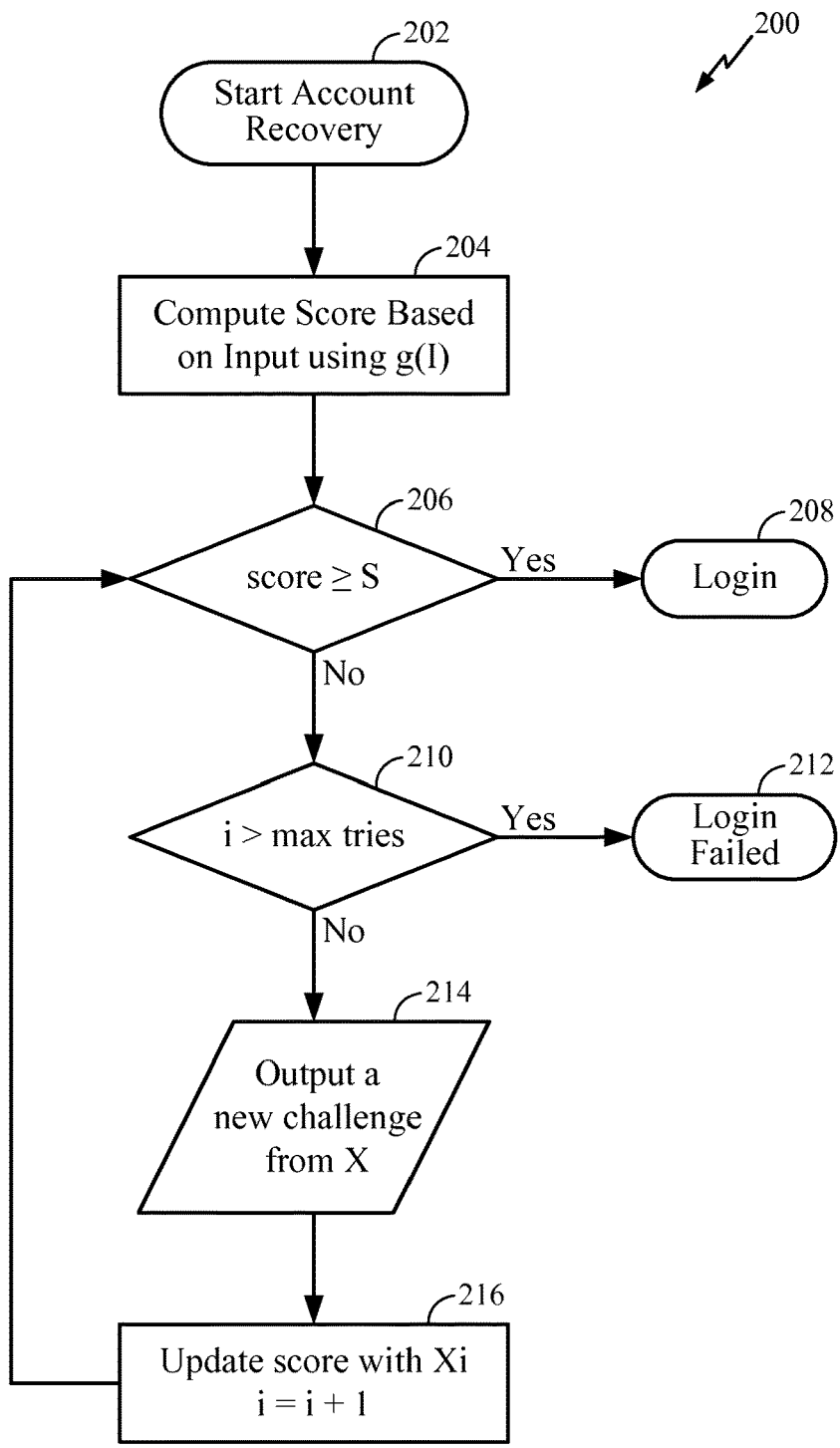
FIG. 2 is a flow diagram illustrating another implementation of a process for on-line account recovery.

FIG. 2 is a flow diagram illustrating an implementation of another example process, referenced herein at 200, that may be performed, in whole or in part, to facilitate and/or support one or more operations and/or techniques for on-line account recovery, such as to authenticate an on-line user, such as an Internet user associated with a registered account of a provider of goods and/or services, for example. Likewise, it should be noted that content acquired and/or produced, such as, for example, input signals, output signals, operations, results, etc. associated with example process 200 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example authentication process 200 for on-line account recovery may, for example, begin at operation 202 and may proceed to operation 204, at which one or more appropriate scores may be computed. For example, here, a confidence score may be computed based, at least in part, on an input vector probability score and/or a contextual indicator probability score, such as via one or more approaches discussed above. As illustrated, process 200 may further proceed to operation 206, where a computed confidence score may be compared against a suitable threshold value, such as a confidence threshold value S, as one possible example. Here, if it is determined that a confidence score meets (or exceeds) a confidence threshold value S, an on-line user, such as an Internet user associated with a registered account of a provider of goods and/or services, for example, be authenticated, such as granted access to a registered on-line account without further identity verification, as referenced at 208, at which point process 200 may terminate.

If it is determined, however, that a confidence score does not meet (e.g., falls below) a confidence threshold value S, for example, process 200 may proceed to operation 210 for a determination of whether a number of attempted challenges exceed some lockout threshold value. If yes, on-line account recovery process 200 may be terminated, and a registered account may be locked out, as discussed above and as illustrated at operation 212, for example. If no, on the other hand, at operation 214, an appropriate challenge may, for example, be generated, such as determined in connection with a remainder confidence score, as one possible example, and/or presented to a user as a separate challenge or a set of challenges, as was also indicated. As referenced at operation 216, in some instances, such as if a user attempts account recovery a second, third, etc. time, for example, a suitable score, such as a challenge score may be updated, if applicable. As also seen, process 200 may loop back to operation 206 for the updated score to be compared against a suitable threshold value, such as a confidence threshold value S, which in this particular implementation may correspond to a challenge threshold value. Thus, as illustrated, example authentication process 200 may proceed and/or loop through operations 206, 208, 210, 212, 214, and/or 216 a suitable number of times, such as to determine whether access to a registered account should be granted or denied, for example, such as via generating one or more challenges, as discussed above.

Figure 3:
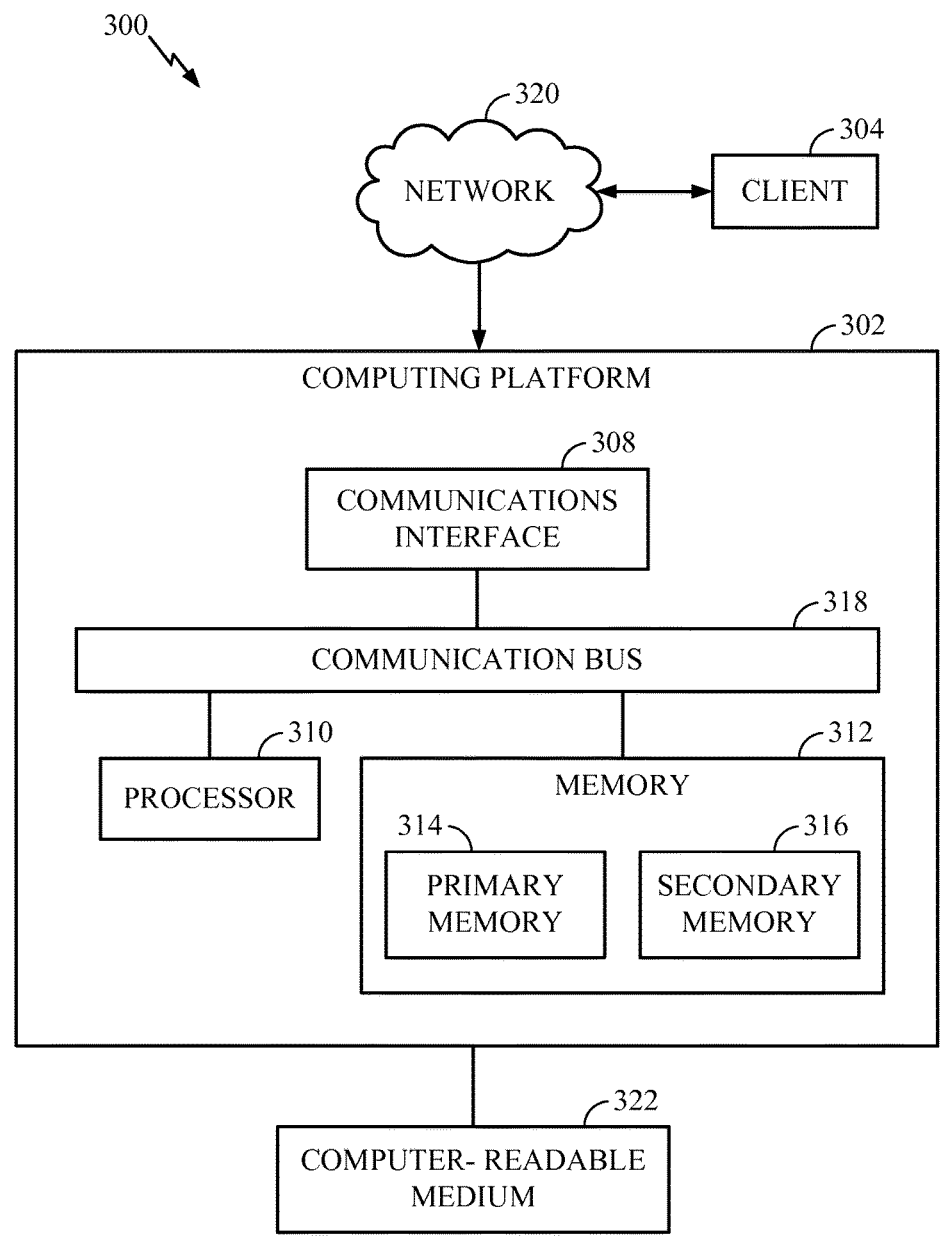
FIG. 3 is a schematic diagram illustrating an implementation of a computing platform that may be employed in a client-server type interaction.

For purposes of illustration, FIG. 3 is an example of an embodiment of a computing platform 300 that may be employed in a client-server type interaction and/or communication, such as, for example, described infra in connection with a browser residing on a suitable device, such as a network device and/or a computing device, for example. In FIG. 3, computing platform 302 may interface with client 304, which may comprise features of a conventional client device, for example. Communications interface 308, processor (e.g., processing unit) 310, and memory 312, which may comprise primary memory 314 and secondary memory 316, may communicate by way of communication bus 318, for example. In FIG. 3, client 304 may represent one or more or more sources of analog, uncompressed digital, lossless compressed digital, or lossy compressed digital formats for content of various types, such as video, imaging, text, audio, etc. in the form physical states or signals, for example. Client 304 may communicate with computing platform 302 by way of an Internet connection via network 320, for example. Although the computing platform of FIG. 3 shows the above-identified components, claimed subject matter is not intended to be limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 310 may be representative of one or more circuits, such as digital circuits, to perform at least a portion of a computing procedure or process. By way of example, but not limitation, processor 310 may comprise one or more processors, such as controllers, microprocessors, microcontrollers, application specific integrated circuits, digital signal processors, programmable logic devices, field programmable gate arrays, and the like, or any combination thereof. In implementations, processor 310 may perform signal processing to manipulate signals or states and/or to construct signals or states, for example.

Memory 312 may be representative of any storage mechanism. Memory 312 may comprise, for example, primary memory 314 and secondary memory 316, additional memory circuits, mechanisms, or combinations thereof may be used. Memory 312 may comprise, for example, random access memory, read only memory, or one or more data storage devices or systems, such as, for example, a disk drive, an optical disc drive, a tape drive, a solid-state memory drive, just to name a few examples. Memory 312 may be utilized to store a program. Memory 312 may also comprise a memory controller for accessing computer readable-medium 322 that may carry and/or make accessible content, code, and/or instructions, for example, executable by processor 310 or some other controller or processor capable of executing instructions, for example.

Under the direction of processor 310, memory, such as memory cells storing physical states, representing for example, a program, may be executed by processor 310 and generated signals may be transmitted via the Internet, for example. Processor 310 may also receive digitally-encoded signals from client 304.

Network 320 may comprise one or more network communication links, processes, services, applications and/or resources to support exchanging communication signals between a client, such as 304 and computing platform 302, which may, for example, comprise one or more servers (not shown). By way of example, but not limitation, network 320 may comprise wireless and/or wired communication links, telephone or telecommunications systems, Wi-Fi networks, WiMAX networks, the Internet, a local area network (LAN), a wide area network (WAN), or any combinations thereof.

The term "computing platform," as used herein, refers to a system and/or a device, such as a computing device, that includes a capability to process (e.g., perform computations) and/or store data in the form of signals and/or states. Thus, a computing platform, in this context, may comprise hardware, software, firmware, or any combination thereof (other than software per se). Computing platform 302, as depicted in FIG. 3, is merely one such example, and the scope of claimed subject matter is not intended to be limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 312 may store cookies relating to one or more users and may also comprise a computer-readable medium that may carry and/or make accessible content, code and/or instructions, for example, executable by processor 310 or some other controller or processor capable of executing instructions, for example. A user may make use of an input device, such as a computer mouse, stylus, track ball, keyboard, or any other similar device capable of receiving user actions and/or motions as input signals. Likewise, a user may make use of an output device, such as a display, a printer, etc., or any other device capable of providing signals, generating visual or audio stimuli or other similar output stimuli for a user.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc.

It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of electronically authenticating an on-line user associated with a registered account of a provider of goods or services, the method comprising:
    electronically initiating an authentication process for a specific client device, the authentication process requiring authentication credentials for the on-line user;
    detecting one or more digital signals comprising one or more input vectors indicative of the specific client device;
    determining one or more contextual indicators descriptive of an on-line activity of the on-line user; and
    authenticating the on-line user without the authentication credentials of the on-line user and based instead on the one or more input vectors and the one or more contextual indicators, the authenticating further comprising:
        computing a first non-binary probability score for the one or more input vectors via a mathematical operation of at least two input vector-related operands indicative of trustworthiness of the specific client device, the first non-binary probability score representing a probability of the specific client device being a trusted device;
        computing a second non-binary probability score for the one or more contextual indicators via a mathematical operation of at least two contextual indicator-related operands indicative of trustworthiness of the on-line user associated with the registered account of the provider of goods or services; and
        granting access to the registered account based, at least in part, on a combination score of the first and the second non-binary probability scores meeting or exceeding a confidence threshold value.

2. The method of claim 1, wherein the granting access to the registered account is based, at least in part, on a confidence score computed as a sum of the first and the second non-binary probability scores meeting a confidence threshold value.

3. The method of claim 2, wherein the confidence score is computed utilizing, at least in part, Fisher's method.

4. The method of claim 1, further comprising electronically generating a first challenge in connection with a subsequent access attempt by the on-line user and in response to the confidence score falling below the confidence threshold value.

5. The method of claim 4, further comprising:
    computing a challenge score based, at least in part, on a response of the on-line user to the first challenge; and
    granting access to the registered account based, at least in part, on the challenge score meeting a challenge threshold value.

6. The method of claim 5, further comprising electronically generating a second challenge in connection with a further subsequent access attempt by the on-line user and in response to the challenge score falling below the challenge threshold value.

7. The method of claim 6, further comprising, in response to a number of attempted challenges exceeding a lockout threshold value, denying access to or locking the registered account.

8. The method of claim 6, wherein the second challenge represents a higher level of difficulty than the first challenge.

9. The method of claim 8, wherein the higher level of difficulty is determined based, at least in part, on a remainder confidence score.

10. The method of claim 1, wherein the one or more input vectors comprise at least one of the following: a browser fingerprint of the specific client device; a browser cookie of the specific client device; an Internet protocol (IP) address of the specific client device; or any combination thereof.

11. The method of claim 1, wherein the one or more contextual indicators comprise at least one of the following: a history of password changes by the on-line user; a history of failed sign-in attempts by the on-line user; a history of successful sign-in attempts by the on-line user; a history of authentication attempts by the on-line user; a history of login attempts of the on-line user; or any combination thereof.

12. An apparatus to electronically authenticate an on-line user associated with a registered account of a provider of goods or services, the apparatus comprising:
one or more processors coupled to a memory and configured to:
electronically initiate an authentication process for a specific client device, the authentication process requiring authentication credentials for the on-line user;
detect one or more digital signals to comprise one or more input vectors indicative of the specific client device;
determine one or more contextual indicators descriptive of an on-line activity of the on-line user; and
authenticate the on-line user without the authentication credentials of the on-line user and based instead on the one or more input vectors and the one or more contextual indicators, wherein the one or more processors are configured to the authenticate the on-line user by:
computing a first non-binary probability score for the one or more input vectors via a mathematical operation of at least two input vector-related operands indicative of trustworthiness of the specific client device, the first non-binary probability score representing a probability of the specific client device being a trusted device;
computing a second non-binary probability score for the one or more contextual indicators via a mathematical operation of at least two contextual indicator-related operands indicative of trustworthiness of the on-line user associated with the registered account of the provider of goods or services; and
granting access to the registered account to be based, at least in part, on a combination score of the first and the second non-binary probability scores meets or exceeds a confidence threshold value.

13. The apparatus of claim 12, wherein the one or more processors are configured to grant access to the registered account based, at least in part, on a confidence score computed as a sum of the first and the second non-binary probability scores that meets a confidence threshold value.

14. The apparatus of claim 13, wherein the one or more processors are further configured to electronically generate a first challenge in connection with a subsequent access attempt by the on-line user and in response to the confidence score falling below the confidence threshold value.

15. The apparatus of claim 14, wherein the one or more processors are further configured to:
compute a challenge score based, at least in part, on a response of the on-line user to the first challenge; and
grant access to the registered account based, at least in part, on the challenge score meeting a challenge threshold value.

16. The apparatus of claim 15, wherein the one or more processors are further configured to electronically generate second challenge in connection with a further subsequent access attempt by the on-line user and in response to the challenge score falling below the challenge threshold value.

17. The apparatus of claim 16, wherein the one or more processors are further configured to deny access to or to lock the registered account if a number of attempted challenges exceeds a lockout threshold value.

18. An article comprising:
a non-transitory storage medium having instructions stored thereon executable by a special purpose computing platform to:
electronically initiate an authentication process for a specific client device, the authentication process requiring authentication credentials for the on-line user;
detect one or more digital signals to comprise one or more input vectors indicative of the specific client device;
determine one or more contextual indicators descriptive of an on-line activity of an on-line user; and
authenticate the on-line user without the authentication credentials of the on-line user and based instead on the one or more input vectors and the one or more contextual indicators, wherein authentication of the on-line user includes:
computing a first non-binary probability score for the one or more input vectors via a mathematical operation of at least two input vector-related operands indicative of trustworthiness of the specific client device, the first non-binary probability score representing a probability of the specific client device being a trusted device;
computing a second non-binary probability score for the one or more contextual indicators via a mathematical operation of at least two contextual indicator-related operands indicative of trustworthiness of the on-line user associated with a registered account of a provider of goods or services; and
granting access to the registered account to be based, at least in part, on a combination score of the first and the second non-binary probability scores meeting or exceeding a confidence threshold value.

* * * * *